May 13, 1969   N. N. FENDER   3,443,450
MECHANISM CONTROL

Filed March 10, 1967   Sheet 1 of 3

INVENTOR.
NORMAN N. FENDER
BY
Harry O. Ernsberger
ATTORNEY

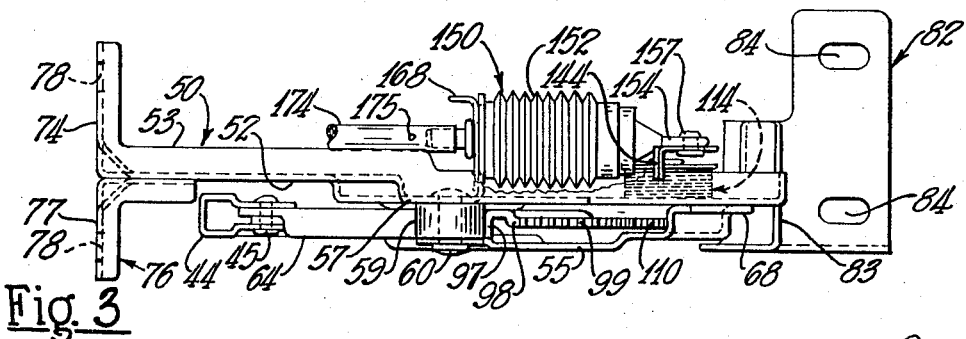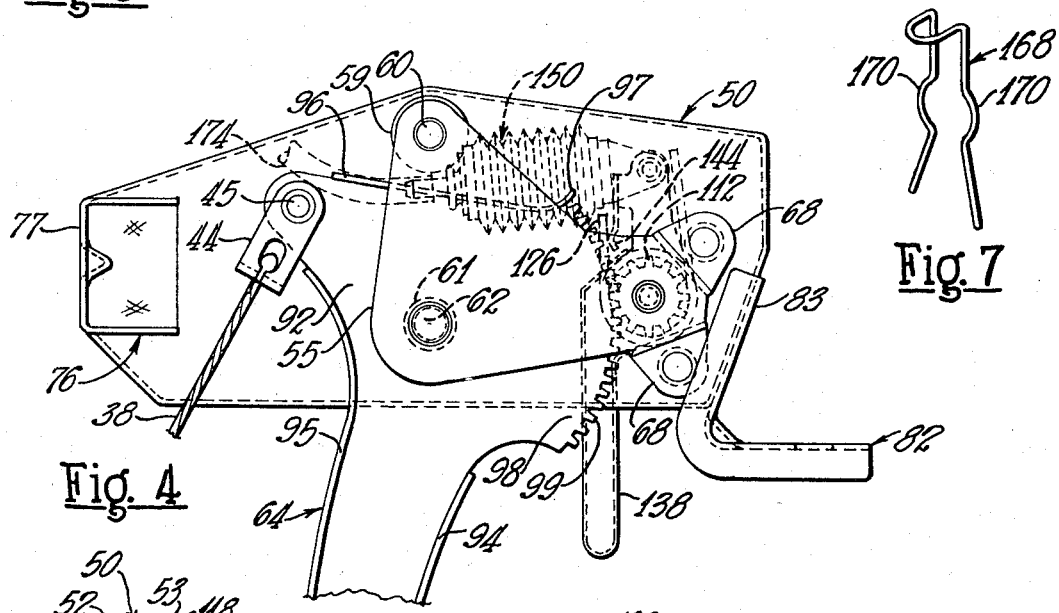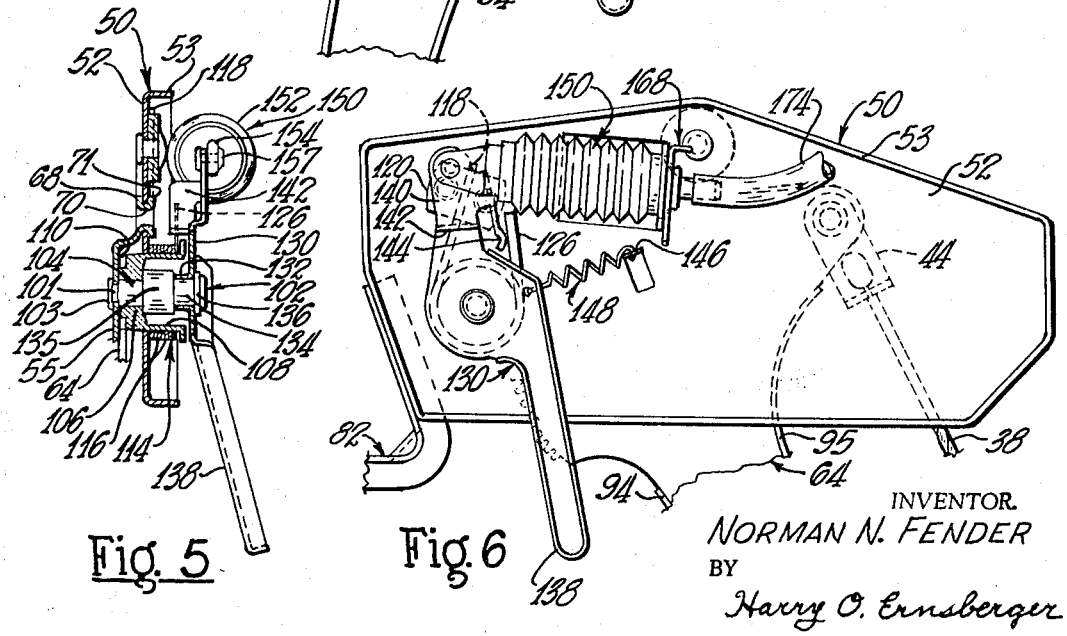

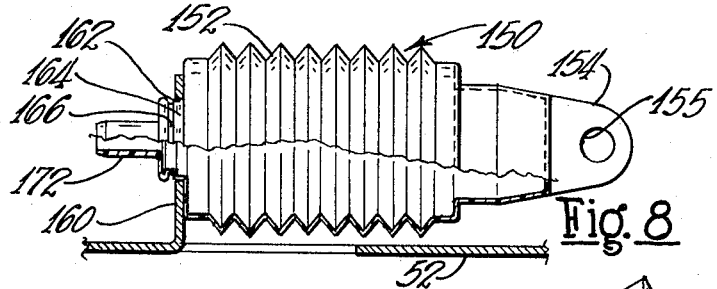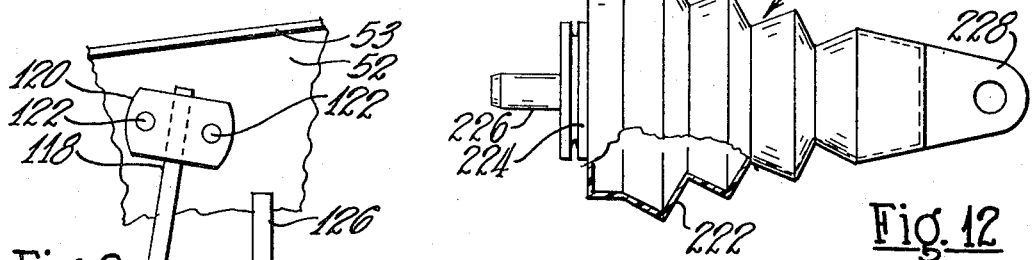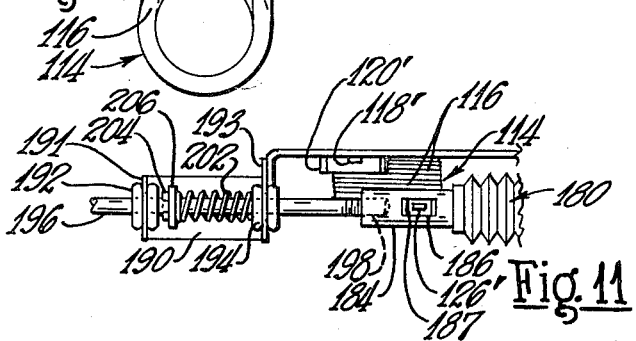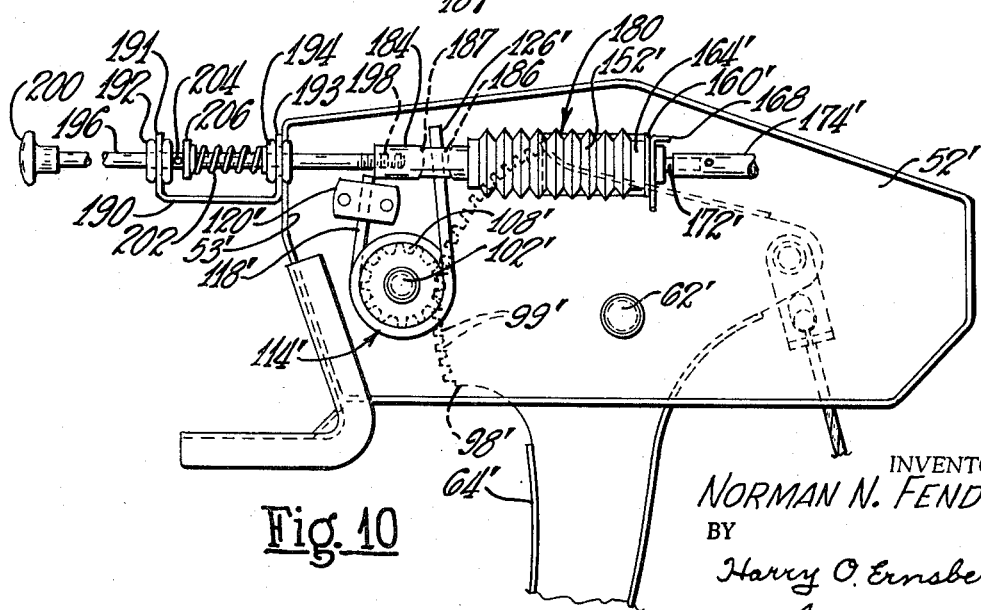

United States Patent Office 3,443,450
Patented May 13, 1969

3,443,450
MECHANISM CONTROL
Norman N. Fender, Erie, Mich., assignor to Universal American Corporation (formerly Robfre Manufacturing Corporation), New York, N.Y., a corporation of Delaware
Filed Mar. 10, 1967, Ser. No. 622,162
Int. Cl. G05g 11/00
U.S. Cl. 74—481
2 Claims

ABSTRACT OF THE DISCLOSURE

This invention relates to mechanism control and particularly to mechanism for actuating and controlling the parking brakes of an automotive vehicle and a release means for the parking brake control. The parking brake control is inclusive of a locking mechanism or means which is released by power or servo-motor means. The release means embodies a bellows-like servo-motor unit arranged for communication with manifold vacuum or other source of reduced pressure for collapsing the bellows-like unit to release the parking brakes.

---

This invention relates to mechanism control and more especially to mechanism for actuating and controlling the parking brakes of an automotive vehicle. Vehicle parking brakes are usually actuated by manual means or foot-operated mechanism, the actuating mechanism being equipped with means for holding the parking brakes in brake setting position. The control mechanism for the parking brakes includes retaining or locking means for retaining the brakes in "set" position.

Various forms of retaining means have been employed which are releasable by manual or foot-operated means or by power actuated means. Developments have been made wherein a coiled element or spring-like member embraces a rotatable drum, the latter connected through motion multiplying means with a brake actuating member or lever, and wherein the coiled element is prestressed and of a diameter to establish friction between the rotatable drum and the coiled element whereby the latter normally grips the drum for holding the brake actuating means in brake setting position. A parking brake actuating and control mechanism of this character is disclosed in my Patent 3,236,120 granted Feb. 22, 1966.

In mechanism control of the character shown in this patent, release of the brake retaining means is effected by relieving the frictional grip of the coiled element on the rotatable drum whereby the brake actuating means under the influence of the conventional brake springs is quickly returned to brake release position. In such devices, one terminal of the coiled element is anchored to a support and the other terminal or distal end maintained free for relative movement to a position to partially uncoil the coiled element to an extent to relieve the friction grip between the drum and the coiled element to release the brake actuating means. The use of a coiled element for retaining a parking brake mechanism in brake setting positions is adaptable for the application of power release means for releasing the grip of the coiled element on the drum.

The foregoing mentioned patent and the Gdowik and Fender Patent 3,236,121 disclose the use of a power unit or servo-motor unit for releasing the coiled element, the power unit comprising a two part metal housing with a diaphragm in the housing, the diaphragm being movable under the influence of reduced pressure or vacuum to release the coiled element. The power or servo-motor units shown in these patents are costly to manufacture, particularly as the housing is fashioned of two metal cup-like members and a positive seal must be effected between the diaphragm and the cup-like members as any leakage renders the power unit ineffective for the intended purpose. Furthermore, such power units comprise several parts rendering manufacture and assembly time consuming and costly.

The present invention embraces a brake actuating mechanism particularly usable for actuating and controlling parking brakes of a vehicle, the mechanism embodying a power means or servomotor for releasing the brake actuating mechanism wherein the power means is fashioned of flexible molded resinous plastic or material of a character influenced by differential pressure for effecting release of the means holding the brake actuating mechanism in brake setting position.

Another object of the invention resides in a parking brake actuating mechanism embodying a locking or retaining means and release means therefor, the release means comprising an accordian-shaped or bellows-shaped hollow member which is collapsible or distortable under differential pressures for controlling the locking or retaining means.

Another object of the invention resides in a mechanism for actuating or controlling parking brakes of a vehicle embodying a locking means controlled by a collapsible or extensible bellows which is preferably fashioned of molded resinous plastic material providing a variable volume chamber adapted to be connected with a source of reduced pressure or vacuum whereby collapsing movement of the bellows-like member is effective to release the locking means for the brake actuating mechanism.

Another object of the invention is the provision of a thin bellows-like member molded of resinous plastic material adapted to be connected with a source of differential pressure whereby the bellows-like member provides in itself a servo-motor unit for releasing a brake locking mechanism without additional components.

Another object of the invention resides in a bellows-like servo-motor of molded material for releasing the parking brakes of an automotive vehicle wherein a single element provides a variable volume chamber which may be collapsed or distorted to actuate the brake blocking means, the arrangement including a novel mounting means for the bellows-like unit by which the bellows-like unit may be readily and quickly assembled or disassembled with a brake actuating mechanism.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention which may be preferred, in which:

FIGURE 3 is a top plan view of the arrangement shown in FIGURE 2;

FIGURE 4 is a side elevational view similar to FIGURE 2 illustrating the mechanism in brake setting position and the locking means in release position;

FIGURE 5 is a sectional view taken substantially on the line 5—5 of FIGURE 2;

FIGURE 6 is an elevational view of the opposite side of the construction;

FIGURE 7 is an isometric view illustrating a securing means for mounting a servo-motor unit for releasing the parking brake actuator;

FIGURE 8 is an elevational view partly in section illustrating a form of bellows-like actuator or servo-motor for the brake release means;

FIGURE 9 is a fragmentary detail view illustrating a locking means for the brake actuator;

FIGURE 10 is a view similar to FIGURE 6 illustrating a modified arrangement of control for the brake actuating means;

FIGURE 11 is a top plan view of the arrangement shown in FIGURE 10, and

FIGURE 12 is an elevational view of a modified form of servo-motor means for releasing the brake locking means.

While the mechanism control of the invention is illustrated as particularly usable for actuating and controlling the parking brakes of a vehicle, it is to be understood that the mechanism control of the invention may be employed wherever it may be found to have utility.

Figure 1:
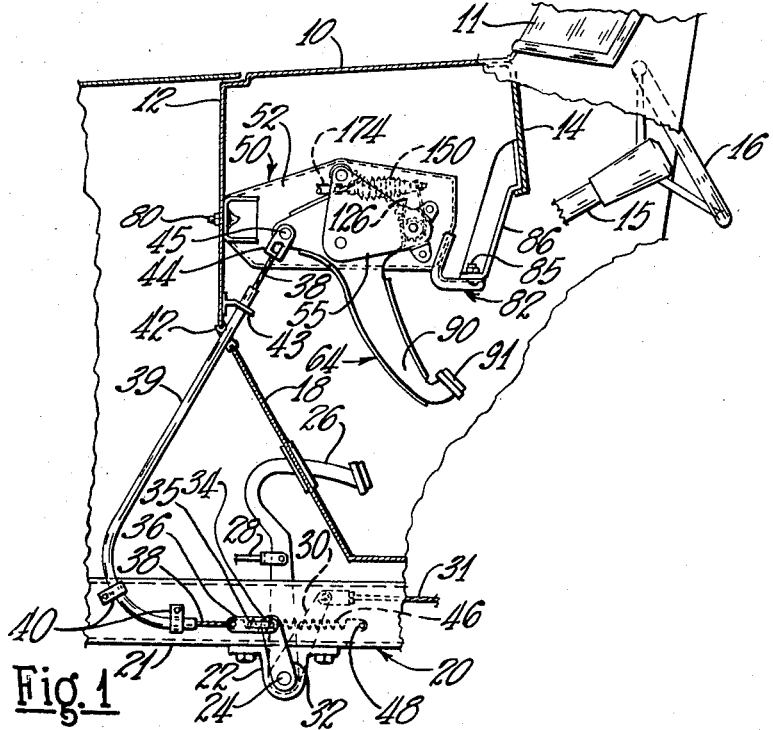
FIGURE 1 is a side elevational view of a portion of the operator's compartment of a vehicle illustrating a form of parking brake control mechanism of the invention.

Referring to the drawings and initially to FIGURE 1, there is illustrated a portion of the operator's compartment of a vehicle including a cowl 10, windshield 11, dashboard or firewall 12, an instrument panel 14, a steering post 15 and a steering wheel 16. A floor construction 18 forms a continuation of the firewall 12. The vehicle includes a chassis frame 20 including parallel frame members, one of which is shown at 21. The frame members 21 are joined by cross members (not shown) of conventional construction.

Secured to the frame members 21 are brackets 22 supporting a shaft 24 on which is journaled a service brake pedal 26 to which is connected a rod 28 for actuating hydraulic means (not shown) of conventional construction for operating the service brakes of the vehicle. Fixedly mounted upon the shaft 24 is an arm 30 connected by a rod or cable 31 with the parking brakes associated with the road wheels of the vehicle, the parking brakes being of conventional construction and embodying springs (not shown) normally holding the parking brakes in release position.

Secured on the shaft 24 is a second arm 32 provided with a pin 34 projecting into a slot 35 of a link 36. The link is connected to the lower end of a flexible brake actuating cable 38 contained within a tubular sheath 39, the sheath being secured to one of the frame members 21 by clips 40. The upper end of the sheath extends through a grommet 42 disposed in an opening in the floor of the vehicle, the upper end of the sheath being anchored to a bracket 43. The upper end of the cable 38 is provided with a clevis 44 for articulate connection with a parking brake actuating construction hereinafter described. A spring 46 connected to the link 35 and to an anchor pin 48 normally biases the link toward brake release position.

The parking brake actuating and control mechanism is mounted upon a support means or frame 50 which is inclusive of a substantially rectangular plake-like member 52 of sheet metal, having a laterally-extending peripheral flange 53.

The support includes a plate-like member 55 which is substantially parallel with but spaced from the member 52, as shown in FIGURE 3. Disposed between an upper portion of the plate 55 and a raised portion 57 of the member 52 is a cylindrical rubber bumper or buffer 59, a rivet 60 extending through aligned openings in the bumper 59 and members 52 and 55 supports the bumper and retains the members in spaced relation.

Figure 2:
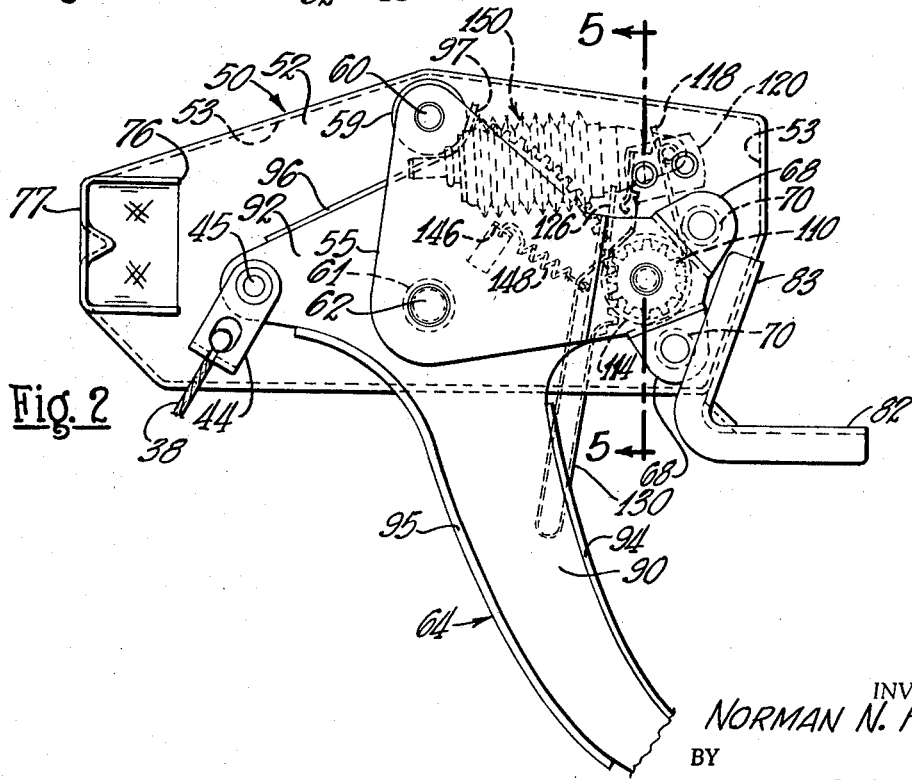
FIGURE 2 is a side elevational view of the mechanism control illustrated in FIGURE 1 showing the mechanism in brake release position.

A second rivet or pin 62 extends through aligned openings in the plates 52 and 55, the pin 62 providing a fulcrum or pivotal support for a pedal or lever 64 for actuating the parking brakes. The plate 55 is fashioned with laterally-offset ear portions 68, each fashioned with an integral tubular projection 70 which extends through an opening in the support member 52 and is swaged as at 71 to secure each ear portion to the support plate 52, as shown in FIGURES 2, 4 and 5. The forward portion of the support member 52 has a laterally extending pad portion 74. Welded or otherwise secured to the support plate 52 is a bracket 76 fashioned to provide a pad portion 77 aligned with pad portion 74.

The pad portions are provided with openings 78 accommodating securing bolts 80 extending through openings in the firewall 12 for anchoring the support plate 52 to the firewall, as shown in FIGURE 1. Disposed at the rear end of the support plate 52 is a bracket 82 having a portion 83 welded to an adjacent region of the flange 53 of the support plate 52.

The bracket 82 is fashioned with slots 84, shown in FIGURE 3, for receiving securing bolts 85, shown in FIGURE 1, securing the bracket to a member 86, the latter being welded or otherwise fixedly anchored to the instrument panel 14 or other means in the operator's compartment.

The foot-operated lever or brake actuator 64 is preferably of one piece construction of metal, such as sheet steel, having a depending portion 90 equipped with a foot pad portion 91. The lever is fashioned with an integral laterally-extending hub portion 61 through which extends the fulcrum pin 62 providing for pivotal movement of the lever. The lever is fashioned with a projecting portion 92 to which the clevis member 44 is pivotally connected by a pin 45. The lever 64 is fashioned with laterally extending integral flanges 94 and 95 to impart strength and rigidity to the lever.

The upper region of the lever 64 is fashioned with a laterally extending reinforcing flange 96 terminating in a curved portion 97, the curved portion 97 engaging the rubber bumper 59, the latter cushioning the impact of the lever on its return movement to brake release position. The lever is fashioned with an arcuate of sector-shaped portion 98 formed with teeth 99 providing a curved rack construction. As particularly shown in FIGURE 5, the support plate 55 is fashioned with an opening to receive a tenon portion 101 of a trunnion or pin 102, the projecting portion of the tenon being swaged as at 103 to secure the pin 102 to the support plate 55.

The pin 102 is fashioned with a portion 104 on which is journaled a hub 106 of a drum 108. The hub portion 106 of the drum 108 is fashioned with integral pinion teeth 110 forming a pinion 112, the teeth of the pinion being enmeshed with the teeth 99 of the arcuately shaped rack construction on the lever 64. Upon rotation or pivotal movement of the lever 64 about its fulcrum pin 62, the drum 108 will be rotated by reason of enmeshment of the teeth of the pinion with the teeth 99 on the lever 64.

It will be apparent from FIGURES 1, 2 and 4, that the radial distance or the radius of the pitch line of the teeth 99 on the sector 98 from the axis of the fulcrum pin 62 is several times the distance of the radius of the pitch line of the pinion teeth 110 from the axis of the drum 108, the distances illustrated being approximately in the ratio of five to one. It is to be understood that the radii of the pitch circles of the teeth 99 and pinion teeth 110 may be of a different ratio depending upon the force or motion multiplication desired.

The arrangement is inclusive of a locking or retaining means cooperating with the drum 108 for retaining or holding the lever 64 and the parking brake mechanism in brake setting positions. The lever retaining or locking means comprises a coiled element 114 of spring-like configuration having a plurality of convolutions 116, the strip material providing the coiled element 114 being of hardened spring steel or similar material, the strip being comparatively thin in relation to its width, as shown in FIGURE 5.

The convolutions 116 are flat and are wound in close relation as shown in FIGURE 5. The inner diameter of the coiled element 114 is of a dimension to normally snugly fit onto the exterior cylindrical surface of the drum 108.

The convolutions or coils 116 of the coiled element 114 are wound and prestressed in hardening whereby they normally frictionally grip the exterior surface of the drum 108 providing a locking means for holding the drum, lever and parking brakes in brake setting positions. The coiled element 114 has one terminal portion 118 which is anchored to a member 120 secured to the support plate 52 by means of rivets 122. The terminal portion 118 extends into a slot formed in member 120, the base of the slot being serrated to grip the terminal portion 118 in the slot. An anchoring means of this character is disclosed in Gdowik and Fender Patent 3,236,121 granted Feb. 22, 1966.

The opposite end region or terminal portion 126 of the coiled element is unsecured and disposed for freedom of movement to enable the convolutions 116 of the coiled element 114 to normally frictionally grip the surface of the drum 108. The prestressed convolutions 116 of the locking means 114 inherently frictionally grip the exterior surface of the drum 108, the gripping characteristics of the convlutions being adequate to retain or lock the brake actuating mechanism in brake setting position.

The convolutions 116 are coiled in a direction whereby rotation of the drum 108 during brake setting movement of the lever 64 tends to unwind the convolutions in a counterclockwise direction as viewed in FIGURES 2 and 4 thereby presenting a minimum of frictional resistance or drag between the drum and the convolutions. The sector and pinion construction hereinbefore described provides a motion multiplying or force reducing arrangement whereby substantial rotation of the drum 108 is attained as compared with the angular movement of the lever 64 in setting the brakes, and the locking force required of the locking means 114 is proportionately reduced for holding the drum 108 in brake setting position.

It is found that a very slight relative movement of the distal or free terminal portion 126 is sufficient to partially unwind the convolutions 116 and thereby release or render ineffective the frictional grip of the convolutions 116 on the drum 108 whereby the conventional brake springs in cooperation with the spring 46, shown in FIGURE 1, return the lever 64 to brake release position. Means is provided for releasing the coiled element 114, either manually or through a power unit or servomotor means of the invention. As particularly shown in FIGURES 2, 5 and 6, a member 130 is fashioned with a laterally extending tubular hub portion 132 which is journaled on a portion 134 of the pin 102.

The pin 102 is provided with an enlarged intermediate section 135 for spacing the member 130 from the hub portion of the drum 108. A washer 136 and the adjacent swaged portion of the pin 102 secure the member 130 on the portion 134 of the pin.

The member 130 is mounted for relative rotation on the portion 134 of the pin and is provided with a depending hand grip portion 138. The member 130 is formed with an upwardly extending projection 140 for connection with a power unit and with a laterally extending projection 142 terminating in a curved portion 144, the latter being normally disposed adjacent but spaced from the freely movable terminal portion 126 of the coiled element 114.

As particularly shown in FIGURES 2 and 6, the support plate 52 is fashioned with a laterally extending projection 146. A contractile coil spring 148 has one end connected with the member 130 and the other end connected with the projection 146, the spring 148 being effective to bias the member 130 for rotation in a counterclockwise direction, as viewed in FIGURE 6, to maintain the portion 144 thereof normally out of engagement with the terminal portion 126 of the coiled element.

The arrangement includes a novel power unit or servo-motor for releasing the grip of the coiled element 114 on the drum 108 to release the lever 64 for movement to brake release position. One form of servo-motor construction of the invention is particularly illustrated in FIGURES 1 through 6. The servo-motor unit 150 has a bellows-like or accordian-like portion 152 which is of hollow thin-walled construction fashioned of molded resinous plastic material such as a copolymer of ethylene and vinyl acetate, known commercially as Ultrathene.

By fashioning the plaited or bellows portion 152 of thin wall bellows-like shape, a reduced pressure or partial vacuum impressed interiorly of the portion 152 will effect a lengthwise collapsing movement of the bellows portion 152 Integrally molded with one end of the bellows portion 152 is a connecting portion 154 having an opening 155, as shown in FIGURE 8. The projection 140 on the member 130 is fashioned with an opening for registration with the opening 155, a rivet or pin 157 extending through the openings providing an articulate or pivotal connection between the servo-motor means 150 and the member 130.

As shown in FIGURES 3 and 8, the support plate 52 is fashioned with a laterally extending portion 160 provided by partially severing metal from the plate 52 and bending the portion 160 in a direction normal to the plane of the support plate 52. The laterally extending portion 160 is fashioned with a circular opening 162 accommodating a shoulder portion 164 formed on the opposite end of the bellows portion 152. The shoulder portion 164 is fashioned with a peripheral recess 166 to receive a clip or securing member 168, the clip being shown in FIGURES 3, 6 and 7.

As shown in FIGURE 7, the clip is of conventional character fashioned of spring wire and having curved portions 170 which engage in the recess 166 and thereby anchor the servo-motor unit 150 to the support plate 52. It is to be understood that the servo-motor 150 may be anchored to a support by other suitable means if desired. The servo-motor unit 150 is fashioned with a tubular nipple portion 172 integrally molded with the bellows portion 152.

The nipple is adapted to receive an end of the hose or tubular member 174, as shown in FIGURES 1, 3, 4 and 5, for connection with a valve means (not shown) of conventional construction connected with a source of reduced pressure such as the intake manifold of the internal combustion engine of the vehicle. The valve means (not shown) for controlling the impression of reduced pressure within the bellows 152 may be of the character shown in McLeod Patent 2,781,117. The valve means is intercalated with the transmission selector control whereby movement of the control member into any drive position effects movement of the valve to impress reduced pressure or partial vacuum in the bellows 152.

As the bellows 152 is fashioned of thin walls of flexible resinous plastic, the bellows is collapsed in a lengthwise direction and being connected to the member 130 rotates the member 130 about its supporting pin 102 to engage the projection 144 with the distal or freely movable terminal 126 of the coil element 114 to release the parking brakes. Through this arrangement the power unit 150 is actuated to automatically release the parking brakes prior to the transmission of power from the engine to the drive wheels of the vehicle.

A small breather aperture 175 is provided, preferably in the tube 174, as is conventional practice in the use of servo-motors as disclosed in the McLeod Patent 2,781,117. The breather aperture 175 is small enough to permit vacuum or reduced pressure to build up in the chamber provided by the bellows 152 when applied thereto, and yet is large enough to permit relief of vacuum in the bellows 152 after its function has been carried out.

Upon restoration of atmospheric pressure within the bellows coupled with the biasing force of the spring 148, the bellows is returned to normal position to disengage the portion 144 of member 130 from the terminal 126 of the coiled element. The thickness of the wall 152 of the bellows construction may be varied depending upon the amplitude of reduced pressure or vacuum impressed in the chamber provided by the bellows section 152.

It is found that the molded bellows portion may have a wall thickness in a range of from fifteen thousandths of an inch to forty thousandths of an inch. It is found that the thickness of the bellows wall should be about twenty-five thousandths of an inch. The thickness of the peripheral regions of the convolutions, plaits or folds may be of a thickness greater than the thickness of the wall regions of the folds or convolutions to resist tendency for inward radial collapsing movement under the influence of the reduced pressure.

The bellows arrangement may be quickly and easily assembled to the support plate 52 by inserting the shoulder portion 164 in the opening 162 in the support member 160 and affixing the spring clip 168 with the curved portions 170 of the clip nesting in the circumferential recess 166, as shown in FIGURE 6.

FIGURES 10 and 11 illustrate a modified arrangement embodying the servo-motor means for effecting release of the grip of the coiled element on the drum for releasing the parking brakes.

In this form the support means or plate 52′ supports a lever construction 64′ through a fulcrum pin 62′, the teeth 99′ of the rack portion or sector 98′ being enmeshed with a pinion portion on the drum 108′ which is journaled for rotation on a pin 102′. The drum 108′ is embraced by the coiled gripping element 114′, the terminal portion 118′ being anchored by a member 120′ secured to the support plate 52′.

Release of the coiled element 114′ from gripping engagement with the drum 108′ is accomplished automatically by a power unit or servo-motor means 180, the bellows portion 152′ thereof being substantially the same as the bellows 152 shown in FIGURE 8. A shoulder portion 164′ on one end region of the bellows is anchored to a projection 160′ on the support plate 52′ by means of the clip 168 shown in FIGURE 7. A nipple portion 172′ integrally molded with the bellows 180 is connected with a source of reduced pressure or partial vacuum by a flexible tube 174′ through a transmission selector controlled valve means (not shown).

The opposite end of the servo-motor unit 180 is fashioned with a longitudinally extending projection 184 having a slot 186 to receive the freely movable terminal portion 126′ of the coiled element 114′. The terminal portion 126′ is of greater length than the terminal portion 126 shown in FIGURE 9 so as to extend into the slot 186 in the projection 184. Welded or otherwise secured to the flange 53′ of the support plate 52′ is a U-shaped bracket 190. The laterally extending portion 191 of the bracket 190 is fashioned with an opening accommodating a tubular grommet such as a rubber grommet 192.

The second laterally extending portion 192 is welded to the flange 53′ and is fashioned with a similar opening accommodating a second tubular grommet 194. Slidably mounted in the grommets 192 and 194 is a rod or member 196 preferably having a threaded portion 198 threaded into an opening in the projection 184 to establish connection between the rod 196 and the servo-motor unit 180. The end of the rod 196 is provided with a manipulating button 200. Surrounding the rod 196 is an expansive coil spring 202, one end of which abuts the grommet 194. The rod 196 is provided with a transversely extending pin 204 forming an abutment for a washer or disc 206.

The opposite end of the coiled spring 202 abuts the washer 206. The expansive pressure of the coil spring 202 normally biases the servo-motor unit 180 in a left-hand direction, as viewed in FIGURE 10, to a position wherein the terminal portion 126′ of the coiled element is free so that the coiled element exerts its normal gripping force on the drum 108′.

Under normal conditions the bellows 152′ is subjected to reduced pressure such as pressure derived from an intake manifold of the engine, when the transmission selector is moved to any drive position as hereinbefore described and partial vacuum impressed in the bellows to collapse the bellows longitudinally in a right-hand direction as viewed in FIGURE 10, engaging the surface 187 of the slot 186 with the terminal portion 126′ to move the latter to release the frictional grip of the coiled element 114′ on the drum 108′ and thereby effect release of the parking brakes.

Through the provision of the breather opening or vent 175′, atmospheric pressure is eventually restored within the bellows, and coupled with the expansive pressure of the coiled spring 202, the bellows is extended to move the curved surface 187 out of engagement with the terminal portion 126′ to again permit the coiled element to exert its normal frictional grip on the drum 108′.

Release of the parking brake may be effected manually by exerting pressure on the button 200 and the rod 196 in a righthand direction as viewed in FIGURE 10, engaging the surface 187 of the portion 184 with the terminal portion 126′, moving the latter in a clockwise direction as viewed in FIGURE 10 to release the grip of the coiled element on the drum 108′ to release the parking brakes. Upon removal of manual presure on the button 200, the coil spring 202 moves the rod 196 in a lefthand direction, restoring the servo-motor 180 to its normal position out of engagement with the terminal portion 126′.

FIGURE 12 illustrates a modified form of servo-motor construction formed of molded resinous plastic such as a copolymer of ethylene and vinyl acetate. The servo-motor construction 220 includes a thin-walled bellows-like section 222 terminating at one end in a shoulder 224 by which the bellows construction is supported. A tubular nipple portion 226 is adapted for connection with a source of reduced pressure or partial vacuum. The opposite end of the bellows is provided with a portion 228 which may be connected with a member such as the member 130 for releasing the coiled element.

The successive convolutions or folds of the bellows are of progressively decreasing diameter as shown in FIGURE 12. Upon impression of reduced pressure within the hollow bellows section 222, the folds, convolutions or plaits collapse in a left-hand direction, as viewed in FIGURE 12, to effect release of the parking brakes where the bellows 220 is employed in an installation in lieu of the bellows 150 hereinbefore described.

It is to be understood that the right-hand end region of the servo-motor unit 220 may be fashioned in the manner of the servo-motor unit 180 to accommodate the free terminal portion 126′ of the coiled element in the manner shown in FIGURE 10.

While it has been pointed out that a copolymer of ethylene and vinyl acetate is a preferred resinous plastic for use for the bellows construction, other suitable resinous plastic materials having similar characteristics may be utilized for the bellows construction. It should be noted that in the bellows arrangements, the bellows is a molded sealed chamber except for the tubular nipple for connection with a source of reduced pressure and hence the servo-motor unit may be inexpensively manufactured as it comprises a single molded unit.

It is apparent that, within the scope of the invention, modifications and different arrangements may be made other than as herein disclosed, and the present disclosure is illustrative merely, the invention comprehending all variations thereof.

I claim:

1. Mechanism for controlling parking brakes of a vehicle including, in combination, support means, a brake actuating lever pivotally mounted on the support means for movement relative thereto, a cylindrical member journaled on the support means for rotation about an axis spaced from the pivotal axis of the lever, motion multiplying means for transmitting movement of said lever to said cylindrical member for rotating the member, a constriction element embracing the rotatable member shaped to engage and retain the member in positions to which it is moved by the actuator, said constriction element having terminal portions, a first terminal portion being anchored in a relatively fixed position, the second terminal portion being normally unrestricted, means for actuating the unrestricted terminal portion to release retaining engagement of the constriction element with the cylindrical member including a member having a distortable hollow bellows, means for anchoring one end region of the bellows against relative movement, means associated with the bellows adapted to engage the unrestricted terminal portion upon distortion of the bellows, said bellows being adapted to be distorted by differential fluid pressure to effect release of the constriction element from retaining engagement with the cylindrical member to release the brake actuating lever for movement to brake release position, and spring means normally maintaining the bellows member in undistorted condition.

2. The combination according to claim 1 wherein the bellows member has a shoulder at one end region, a projection associated with the support means having an opening receiving said shoulder, the portion of the shoulder extending through the opening having a peripheral recess, and a spring clip engaging in said recess retaining the shoulder in said opening.

References Cited

UNITED STATES PATENTS

| | | | |
|---|---|---|---|
| 862,867 | 8/1907 | Eggleston | 92—100 |
| 3,236,120 | 2/1966 | Fender | 74—531 |
| 3,313,319 | 4/1967 | Osborn et al. | 92—34 XR |
| 3,319,532 | 5/1967 | Pridham | 92—34 |

HALL C. COE, *Primary Examiner.*

U.S. Cl. X.R.

74—53; 92—34